US011200802B1

(12) United States Patent
Edwardson

(10) Patent No.: US 11,200,802 B1
(45) Date of Patent: Dec. 14, 2021

(54) DYNAMIC ACTIVATION OF VIRTUAL PHASE SELECTORS FOR CONTROL OF TRAFFIC SIGNAL PREEMPTION

(71) Applicant: Global Traffic Technologies, LLC, St. Paul, MN (US)

(72) Inventor: David John Edwardson, Shoreview, MN (US)

(73) Assignee: Global Traffic Technologies, LLC, St. Paul, MN (US)

( * ) Notice: Subject to any disclaimer, the term of this patent is extended or adjusted under 35 U.S.C. 154(b) by 0 days.

(21) Appl. No.: 16/902,454

(22) Filed: Jun. 16, 2020

(51) Int. Cl.
*G08G 1/07* (2006.01)
*G08G 1/0965* (2006.01)
*G08G 1/087* (2006.01)
*H04W 4/029* (2018.01)
*G08G 1/09* (2006.01)
*G08G 1/01* (2006.01)
*G08G 1/095* (2006.01)

(52) U.S. Cl.
CPC ......... *G08G 1/0965* (2013.01); *G08G 1/0116* (2013.01); *G08G 1/087* (2013.01); *G08G 1/091* (2013.01); *G08G 1/095* (2013.01); *H04W 4/029* (2018.02)

(58) Field of Classification Search
None
See application file for complete search history.

(56) References Cited

U.S. PATENT DOCUMENTS

| 5,539,398 A * | 7/1996 | Hall ................. G08G 1/087 340/906 |
| 8,487,780 B2 * | 7/2013 | Edwardson ........ G08G 1/087 340/906 |
| 8,830,085 B2 | 9/2014 | Edwardson |
| 8,912,922 B2 | 12/2014 | Eichorst |

(Continued)

OTHER PUBLICATIONS

U.S. Appl. No. 16/788,716, filed Feb. 12, 2020, and entitled: Location-Based Message Distribution. The Examiner is referred to the copending patent prosecution of the common Applicant, Edwardson. (No attachment).

(Continued)

*Primary Examiner* — Brent Swarthout

(57) ABSTRACT

According to the disclosed approaches, a server system receives vehicle messages having information transmitted from vehicle processors. Each vehicle message specifies published geographical coordinates that indicate a geographical location of a vehicle. For each vehicle message, the server system determines one or more virtual phase selectors associated with the published geographical coordinates; determines whether each virtual phase selector is active or inactive; starts execution of each virtual phase selector determined to be in inactive; and communicates the vehicle message to the one or more virtual phase selectors. Each virtual phase selector determines traffic signal control data based on the vehicle message and transmits the traffic signal control data to a traffic signal controller associated with the virtual phase selector. The method includes stopping execution of an executing virtual phase selector in (Continued)

response to absence of a vehicle message having published geographical coordinates associated with the executing virtual phase selector for a period that is greater than a threshold period.

18 Claims, 8 Drawing Sheets

(56) References Cited

U.S. PATENT DOCUMENTS

| | | |
|---|---|---|
| 2006/0273925 A1* | 12/2006 | Schwartz ............... G08G 1/087 340/907 |
| 2007/0008173 A1* | 1/2007 | Schwartz ............... G08G 1/087 340/902 |
| 2011/0109477 A1 | 5/2011 | Edwardson et al. |
| 2011/0187559 A1* | 8/2011 | Applebaum ............. B60Q 1/00 340/907 |
| 2011/0234423 A1 | 9/2011 | Edwardson |
| 2012/0136559 A1 | 5/2012 | Rothschild |

OTHER PUBLICATIONS

Microsoft Docs, Windows and Containers, article, Oct. 22, 2019, https://docs.microsoft.com/en-us/virtualization/windowscontainers/about/.

USPTO/ISA. International Search Report and Written Opinion dated Sep. 16, 2021 for related international application of the common Applicant, PCT Application Serial No. PCT/US2021/037458, 12 pgs.

\* cited by examiner

EXAMPLES

FIG. 8B

SUBSCRIPTION
topic: "12.345;87.654"
subscriber: ID1
— 552

Lat=12.345678
Long=87.654321
574

FIG. 8E published message
"12.345,87.654"
signal controls
562
564

MESSAGE BROKER

502 Receive location subscription requests, each including a location topic and a subscriber identifier

↓

504 Establish location subscriptions

↓

506 Receive published location messages

↓

508 Determine matches between published locations and subscribed-to locations

↓

510 Discard non-matching location messages

↓

512 Transmit matching location messages to subscribers

FIG. 8A

DYNAMIC ACTIVATION OF VIRTUAL PHASE SELECTORS FOR CONTROL OF TRAFFIC SIGNAL PREEMPTION

FIELD OF THE INVENTION

The present invention is generally directed to controlling traffic signal preemption through operating system-level virtualization and dynamically activated virtual phase selectors.

BACKGROUND

Traffic signals have long been used to regulate the flow of traffic at intersections. Generally, traffic signals have relied on timers or vehicle sensors to determine when to change traffic signal lights, thereby signaling alternating directions of traffic to stop, and others to proceed.

Emergency vehicles, such as police cars, fire trucks and ambulances, generally have the right to cross an intersection against a traffic signal. Emergency vehicles have in the past typically depended on horns, sirens and flashing lights to alert other drivers approaching the intersection that an emergency vehicle intends to cross the intersection. However, due to hearing impairment, air conditioning, audio systems and other distractions, often the driver of a vehicle approaching an intersection will not be aware of a warning being emitted by an approaching emergency vehicle.

Traffic control preemption systems assist authorized vehicles (police, fire and other public safety or transit vehicles) through signalized intersections by making a preemption request to the intersection controller. The controller will respond to the request from the vehicle by changing the intersection lights to green in the direction of the approaching vehicle or extending the green phase of a traffic light. This system improves the response time of public safety personnel, while reducing dangerous situations at intersections when an emergency vehicle is trying to cross on a red light. In addition, speed and schedule efficiency can be improved for transit vehicles. As used herein, traffic signal "preemption" will refer to both changing a traffic signal from red to green in response to signals from an emergency vehicle, and to extending the green phase of a traffic signal in response to signals from a transit vehicle.

There are presently a number of known traffic control preemption systems that have equipment installed at certain traffic signals and on authorized vehicles. One such system in use today is the OPTICOM® system. This system utilizes a high power strobe tube (emitter), located in or on the vehicle, that generates light pulses at a predetermined rate, typically 10 Hz or 14 Hz. A receiver, which includes a photo detector and associated electronics, is typically mounted on the mast arm located at the intersection and produces a series of voltage pulses, the number of which are proportional to the intensity of light pulses received from the emitter. The emitter generates sufficient radiant power to be detected from over 2500 feet away.

Intensity levels are associated with each intersection approach to determine when a detected vehicle is within range of the intersection. Vehicles with valid security codes and a sufficient intensity level are reviewed with other detected vehicles to determine the highest priority vehicle. Vehicles of equivalent priority are selected in a first come, first served manner. A preemption request is issued to the controller for the approach direction with the highest priority vehicle travelling on it.

Another common system in use today is the OPTICOM® GPS priority control system. This system utilizes a GPS receiver in the vehicle to determine location, speed, and heading of the vehicle. The information is combined with security coding information that consists of an agency identifier, vehicle class, and vehicle ID and is broadcast via a proprietary 2.4 GHz radio.

An equivalent 2.4 GHz radio located at the intersection along with associated electronics receives the broadcasted vehicle information. Approaches to the intersection are mapped using either collected GPS (Global Positioning System) readings from a vehicle traversing the approaches or using location information taken from a map database. The vehicle location and direction are used to determine on which of the mapped approaches the vehicle is approaching toward the intersection and the relative proximity to it. The speed and location of the vehicle are used to determine the estimated time of arrival (ETA) at the intersection and the travel distance from the intersection. ETA and travel distances are associated with each intersection approach to determine when a detected vehicle is within range of the intersection and, therefore, a preemption candidate. Preemption candidates with valid security codes are reviewed with other detected vehicles to determine the highest priority vehicle. Vehicles of equivalent priority are generally selected in a first come, first served manner. A preemption request is issued to the controller for the approach direction with the highest priority vehicle travelling on it.

With metropolitan-wide networks becoming more prevalent, additional means for detecting vehicles via wired networks such as Ethernet or fiber optics and wireless networks such as Mesh or IEEE 802.11b/g may be available. With network connectivity to the intersection, vehicle tracking information may be delivered over a network medium. In this instance, the vehicle location is either broadcast by the vehicle itself over the network or it may broadcast by an intermediary gateway on the network that bridges between, for example, a wireless medium used by the vehicle and a wired network on which the intersection electronics resides. In this case, the vehicle or an intermediary reports, via the network, the vehicle's security information, location, speed, and heading, along with the current time. Controllers at intersections and connected to the network receive the vehicle information and evaluate the position using approach maps as described in the OPTICOM® GPS system. The security coding could be identical to the OPTICOM® GPS system or employ another coding scheme.

SUMMARY

A disclosed method includes receiving by a server system, vehicle messages having information transmitted from a plurality of vehicle processors. Each vehicle message specifies published geographical coordinates that indicate a geographical location of a vehicle of a plurality of vehicles. For each vehicle message, the method includes the server system determining one or more virtual phase selectors associated with the published geographical coordinates; determining for each of the one or more virtual phase selectors, whether the virtual phase selector is active or inactive; starting execution of each of the one or more virtual phase selectors determined to be in inactive; and communicating the vehicle message to the one or more virtual phase selectors. The method includes each the one or more virtual phase selectors determining traffic signal control data based on the vehicle message; and transmitting the traffic signal control data to one or more traffic signal controllers associated with the one or more virtual phase selectors at one or more intersections. The method includes stopping execution of an executing virtual phase selector in response to absence of a vehicle message having published geographical coordinates associated with the executing virtual phase selector for a period that is greater than a threshold period.

A disclosed system includes an arrangement of one or more computer processors and a memory arrangement coupled to the one or more computer processors. The memory arrangement is configured with instructions that when executed by the one or more computer processors cause the one or more first processors to perform operations that include receiving vehicle messages having information transmitted from a plurality of vehicle processors. Each vehicle message specifies published geographical coordinates that indicate a geographical location of a vehicle of a plurality of vehicles. For each vehicle message, the operations include determining one or more virtual phase selectors associated with the published geographical coordinates; determining for each of the one or more virtual phase selectors, whether the virtual phase selector is active or inactive; starting execution of each of the one or more virtual phase selectors determined to be in inactive; communicating the vehicle message to the one or more virtual phase selectors; determining traffic signal control data by each of the one or more virtual phase selectors based on the vehicle message; and transmitting the traffic signal control data to one or more traffic signal controllers associated with the one or more virtual phase selectors at one or more intersections. The operations further include stopping execution of an executing virtual phase selector in response to absence of a vehicle message having published geographical coordinates associated with the executing virtual phase selector for a period that is greater than a threshold period.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Various aspects and advantages of the invention will become apparent upon review of the following detailed description and upon reference to the drawings in which:

FIG. 8A shows a flowchart of a process by which subscriptions to location topics are used to manage the distribution of published vehicle messages from vehicles;

FIG. 8B shows an example of information stored as a location subscription;

FIG. 8C shows an example of the geographical area implied by truncation of published geographic coordinates and subscribed-to coordinates;

FIG. 8D shows an example of raw geographical data prior to truncation for a published location message;

FIG. 8E shows an example of a published location message having truncated coordinates;

DETAILED DESCRIPTION

Figure 1:
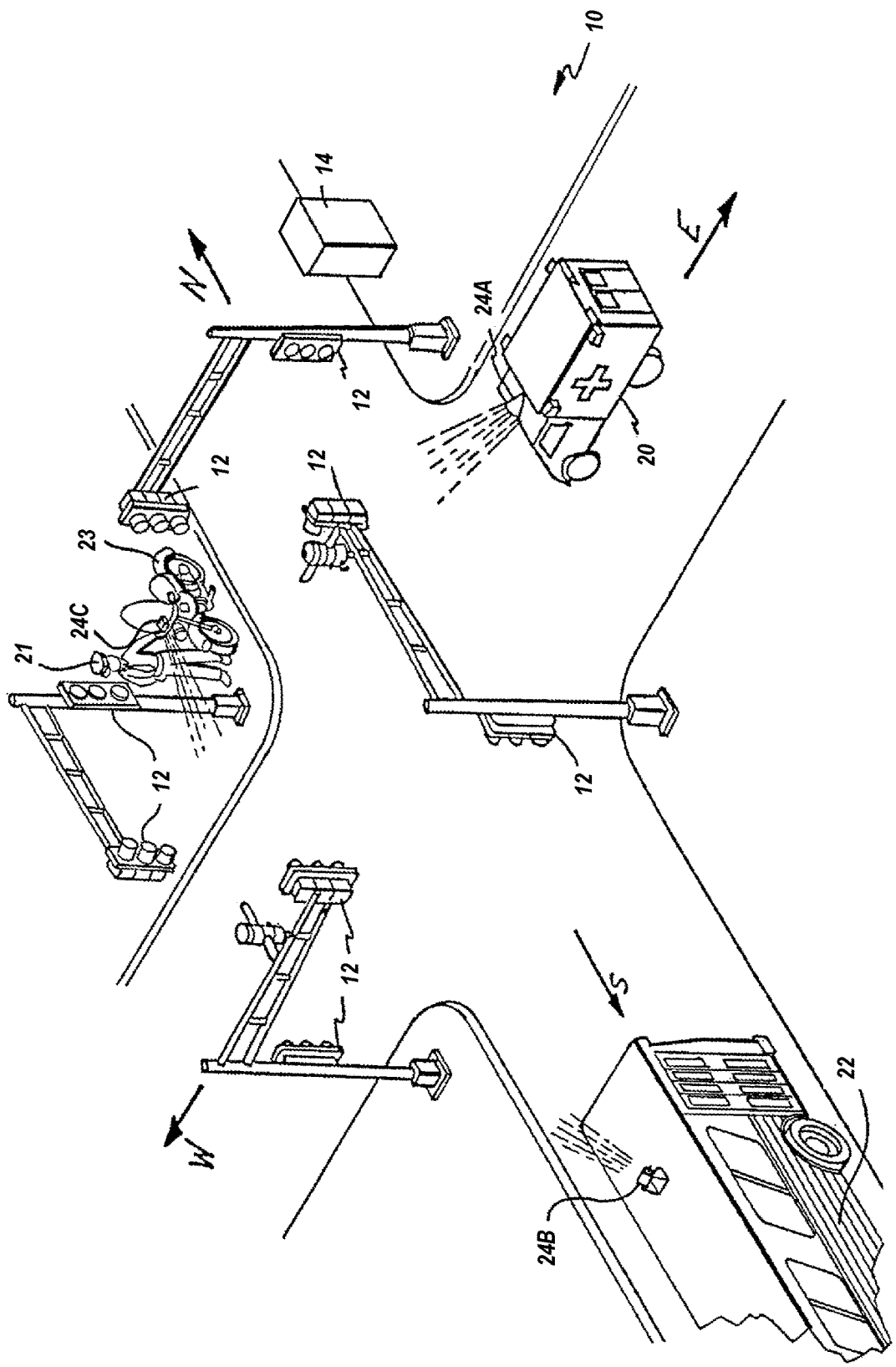
FIG. 1 is an illustration of a typical intersection having traffic signal lights.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Some jurisdictions are moving traffic signal phase control from intersection-based hardware to a central system. A centralized system can provide flexibility over defining intersection approaches, provide extended range for processing priority requests, and reduce maintenance and upgrade costs.

A centralized implementation can involve operating system (OS) level virtualization. OS-level virtualization provides multiple user spaces that are isolated from one another. Some implementations refer to the user spaces as "containers." One or more programs can run within a container, and the OS kernel can limit which computer system resources are visible to the programs within the container. A benefit of containers is portability between different operating systems. Names of comparable and/or similar implementations of users' spaces include "zones," "virtual private servers," "partitions," "virtual environments," "virtual kernels," and "jails."

According to the disclosed approaches, containers can be used to implement virtual phase selectors. Each virtual phase selector is a computer process that implements logic for interrupting the normal sequencing of traffic signal phases at a particular intersection. Each virtual phase selector can be a program managed within a container, and a container can have one or more virtual phase selectors. Virtualized phase selectors can consume considerable computer system resources, and the disclosed approaches considerably reduce the computer system resources consumed in a centralized implementation.

Some areas covered by a centralized traffic signal control system can have thousands of intersections, requiring thousands of virtual phase selectors. Executing thousands of virtual phase selectors as long running services that are always available to process preemption requests would consume considerable computer resources. The disclosed approaches reduce requirements for computer system resources by executing only the ones of the virtual phase selectors that may be needed at different times. That is, when a virtual phase selector is not needed for processing preemption requests for an intersection, that virtual phase selector is idled (execution of the process stopped), and a virtual phase selector is started and executes when that virtual phase selector is needed for processing preemption requests for the intersection. In an implementation involving thousands of intersections, the vast majority of virtual phase selectors can be idled when not needed, thereby significantly reducing the computer system resources needed for centralized control.

Based on the locations of vehicles requesting preemption and locations of intersections associated with the virtual phase selectors, a scheduler determines which virtual phase selectors should be executing and which virtual phase selectors should be idle. A central server system can receive vehicle messages from units aboard vehicles seeking traffic signal preemption. Each vehicle message specifies published geographical coordinates that indicate a geographical location of the transmitting vehicle. In response to each vehicle message, the scheduler determines whether any of the virtual phase selectors is associated with the published geographical coordinates. In response to finding that one or more virtual phase selectors are associated with the published geographical coordinates, the scheduler determines for each of the one or more virtual phase selectors, whether the virtual phase selector is active or inactive. The scheduler starts execution of each of the one or more virtual phase selectors determined to be in inactive and communicates the vehicle message to the executing virtual phase selectors.

Each of the virtual phase selectors receiving the vehicle messages determines traffic signal control data based on the vehicle message. For example, each virtual phase selector determines whether or not a preemption request should be issued to a signal controller at the associated intersection based on the priority level of the vehicle and any other competing requests for preemption. The virtual phase selector transmits the traffic signal control data to the associated traffic signal controller.

The scheduler also monitors executing ones of the virtual phase selectors for lapses in receiving relevant vehicle messages. In response to not receiving a vehicle message that is relevant to an executing virtual phase selector for a period of time that exceeds a threshold, the scheduler stops execution of that virtual phase selector.

FIG. 1 is an illustration of a typical intersection 10 having traffic signal lights 12. The equipment at the intersection illustrates the environment in the disclosed approaches can be used. A traffic signal controller 14 sequences the traffic signal lights 12 to allow traffic to proceed alternately through the intersection 10. The traffic signal controller can include, or have coupled thereto, equipment that is connected to a network through which preemption requests are conveyed.

The traffic control preemption system shown in FIG. 1 includes signal emitters 24A, 24B and 24C (also referred to herein as "vehicle control units") and a traffic signal controller 14. In FIG. 1, an ambulance 20 and a bus 22 are approaching the intersection 10. The signal emitter 24A is mounted on the ambulance 20 and the signal emitter 24B is mounted on the bus 22. The signal emitters 24A and 24B each transmit vehicle messages to a server (not shown) that is configured to operate as a message broker.

The message broker selectively communicates vehicle messages to virtual phase selectors (not shown) based on subscriptions to location topics made by the virtual phase selectors and on the location topics indicated in the vehicle messages. Each virtual phase selector can process received vehicle messages to determine security codes. Each security code can indicate the vehicle class and vehicle identification. A virtual phase selector can issue preemption requests to and withdraw preemption requests from the traffic signal controller 14, and the traffic signal controller can change the phases of the traffic signals accordingly. The traffic signal controller may also receive preemption requests originating from other sources, such as a nearby railroad crossing, in which case the traffic signal controller may determine that the preemption request from the other source be granted before the preemption request from the virtual phase selector.

The virtual phase selector associated with the intersection determines the priority of each received vehicle message and whether to issue a preemption request based on the security code and vehicle messages received from other vehicles. For example, the ambulance 20 may be given priority over the bus 22 since a human life may be at stake. Accordingly, the ambulance 20 would transmit a preemption request with a security code indicative of a high priority while the bus 20 would transmit a preemption request with a security code indicative of a low priority. The virtual phase selector can discriminate between the low and high priority requests and request the traffic signal controller 14 to cause the traffic signal lights 12 controlling the ambulance's approach to the intersection to remain or become green and the traffic signal lights 12 controlling the bus's approach to the intersection to remain or become red.

Figure 2:
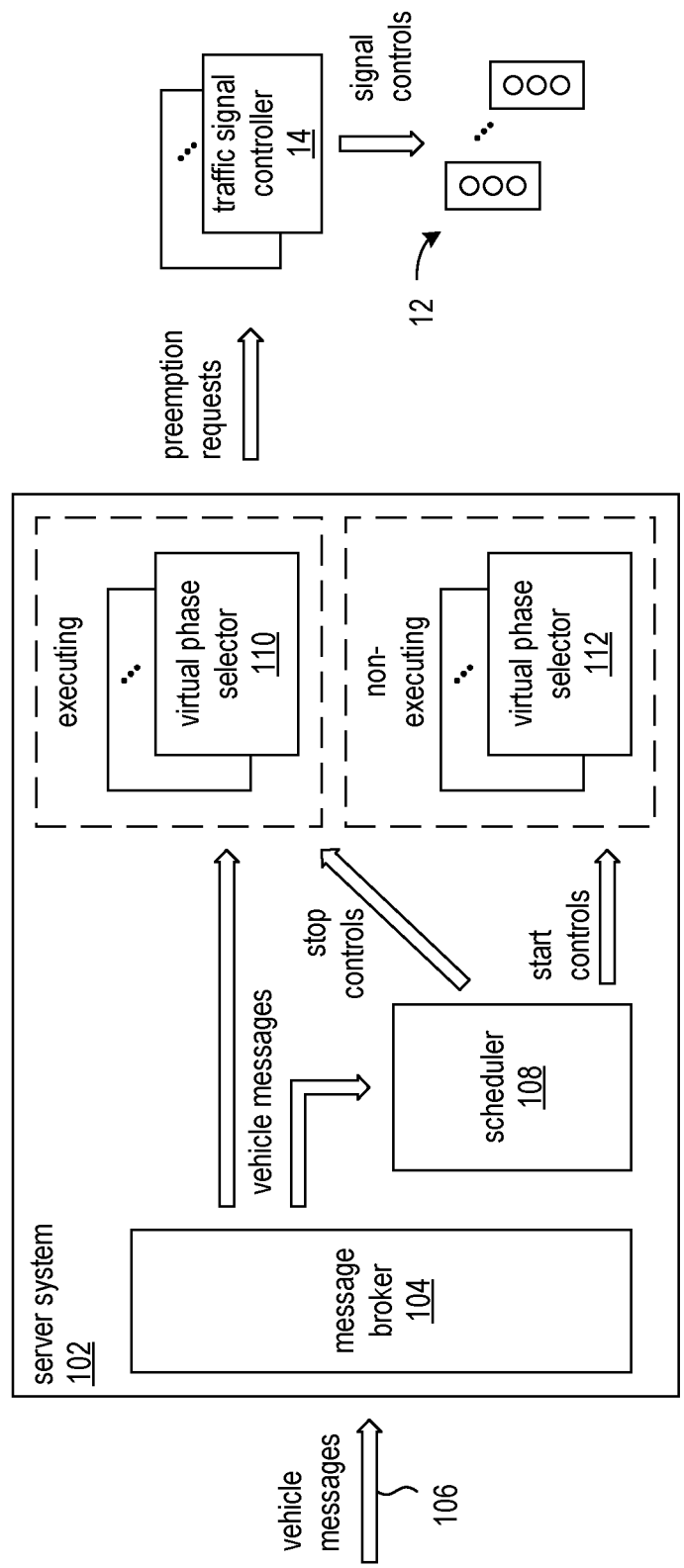
FIG. 2 shows a dataflow diagram associated with the processing of vehicle messages and issuing of traffic signal phase controls.

FIG. 2 shows a dataflow diagram associated with the processing of vehicle messages and issuing of traffic signal phase controls. A server computer system 102 is configured to execute a message broker program 104 that receives vehicle messages 106. Each vehicle message specifies geographical coordinates that indicate a geographical location of the vehicle transmitting the message. The vehicle message also indicates a vehicle priority code.

In response to receiving a vehicle message, the message broker 104 determines whether or not the scheduler 108 and any of the virtual phase selectors 110 have subscribed to the location indicated by the vehicle message. If the vehicle message matches the subscription, the message broker communicates the vehicle message to the scheduler 108 and one or more of the virtual phase selectors.

The scheduler controls starting and stopping execution of the virtual phase selectors 110 and 112. Virtual phase selectors 110 are shown in an executing state, and virtual phase selectors 112 are shown in an idle/non-executing state. In the executing state, a virtual phase selector determines whether or not to issue a preemption request to an associated traffic signal controller based on the priority of the vehicle indicated in the vehicle message. In the idle state, the virtual phase selector is unavailable to process a vehicle message. Thus, an idle virtual phase selector will be unavailable to process subscribed-to vehicle messages until execution is started by the scheduler 108.

The scheduler 108 starts and stops virtual phase selectors based on locations subscribed-to by the virtual phase selectors and vehicle messages received by the scheduler. If the scheduler receives a vehicle message having a location that a virtual phase selector has subscribed to and the virtual phase selector is idle, the scheduler starts the virtual phase selector. If a virtual phase selector is executing, and over a threshold period of time the scheduler does not receive any vehicle messages having locations to which the virtual phase selector has subscribed, the scheduler stops execution of the virtual phase selector.

Each virtual phase selector 110 and 112 is associated with a traffic signal controller 14, which is disposed at an intersection for controlling the phases of traffic signals 12 at that intersection. An executing virtual phase selector selectively issues preemption requests to the associated traffic signal controller based on the priorities indicated in the vehicle messages.

Figure 3:
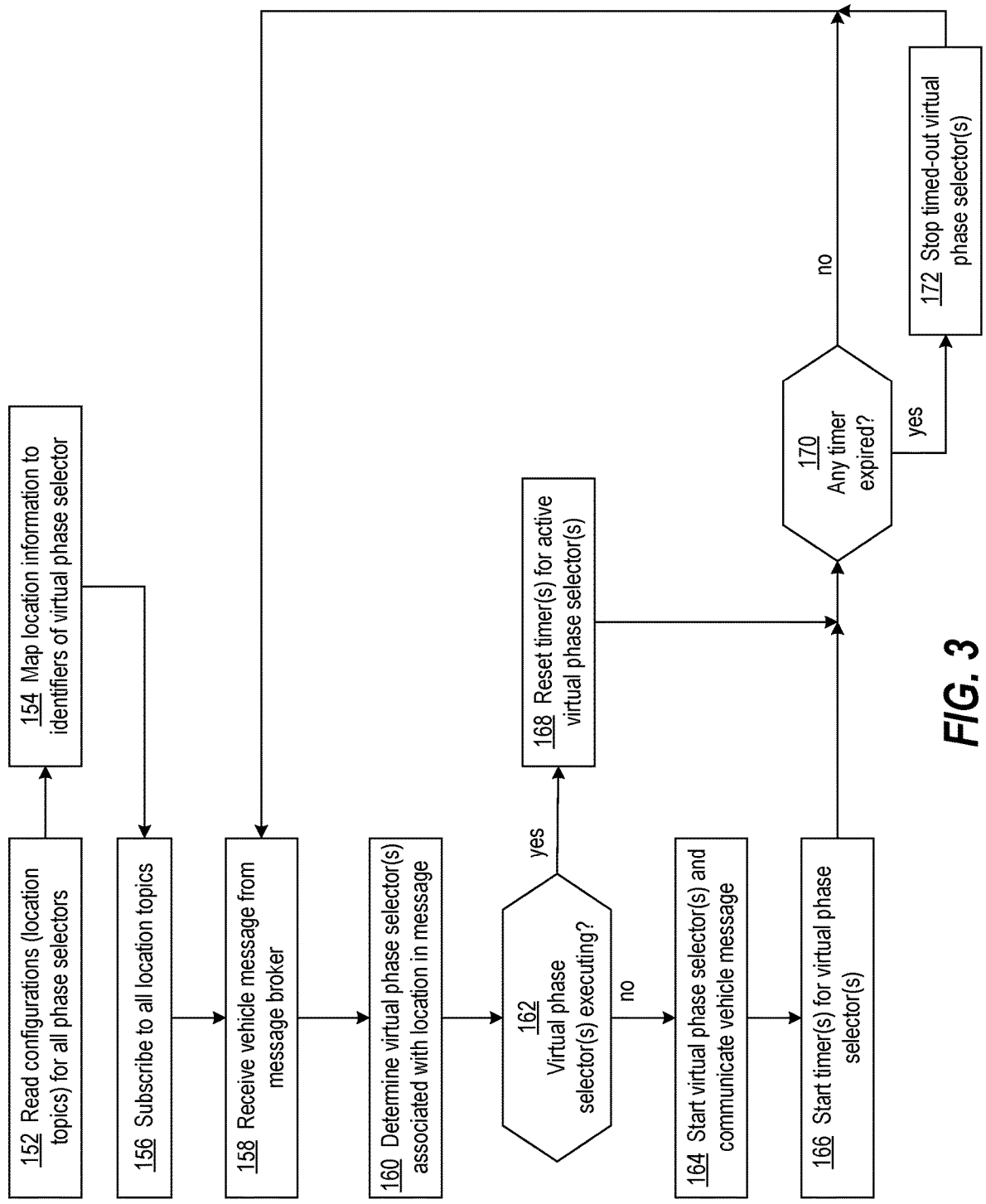
FIG. 3 shows a flow chart of a process performed by a scheduler in starting and stopping execution of virtual phase selectors.

FIG. 3 shows a flow chart of a process performed by a scheduler 108 in starting and stopping execution of virtual phase selectors. At block 152, the scheduler reads configuration data specified for the virtual phase selectors. For each traffic signal controller, the configuration data specify location information to be used by a virtual phase selector associated with that traffic signal controller for subscribing to locations for the purpose of receiving relevant vehicle messages.

The scheduler at block 154 maps the location information associated with each traffic signal controller to an identifier of a virtual phase selector assigned to issue preemption requests to that traffic signal controller. The mapped location information is used by the scheduler to determine when a virtual phase selector can be started in response to a vehicle message.

At block 156, the scheduler subscribes to location topics indicated by the location information associated with all the virtual phase selectors. The subscriptions are made with the message broker (FIG. 2, #104), which communicates received vehicle messages to the scheduler according to the subscribed-to location topics. Each subscription request specifies a location, such as a latitude coordinate and a longitude coordinate, and an associated subscriber identifier. The subscriber identifier can identify and address the scheduler to which a published message is to be sent if the location topic in a published message matches location specified by the subscription.

The scheduler commences processing of received vehicle messages at block 158. At block 158, the scheduler receives a vehicle message from the message broker. At block 160, the scheduler determines which virtual phase selector(s) subscribed to the location topic indicated in the vehicle message by consulting the mapping that was established at block 154.

The scheduler at decision block 162 determines whether the virtual phase selector(s), which was determined at block 160, is executing. According to an exemplary approach, the scheduler can maintain a table of identifiers of the virtual phase selectors and the execution status (executing or idle/non-executing) of each of the identified virtual phase selectors. In response to finding that the identified virtual phase selector(s) is not executing, the scheduler at block 164 starts the virtual phase selector(s) and communicates the vehicle message to the now-executing virtual phase selector(s).

The scheduler maintains a respective timer for each active (executing) virtual phase selector in order to determine when the virtual phase selector can be stopped due to a lapse in vehicle messages specifying locations that the virtual phase selector has subscribed to. Different ones of the timers can be configured to expire after different periods. Alternatively, some or all of the timers can be configured with equal expiration time periods. At block 166, the scheduler starts the timer(s) associated with the virtual phase selector(s). In response to finding at decision block 162 that the virtual phase selector(s) is executing, the scheduler at block 168 resets the timer(s) associated with the identified, active virtual phase selector(s).

At decision block 170, the scheduler checks whether or not any timer has expired. Expiration of a timer indicates that the scheduler has not received, over a period of time that is greater than a threshold period, any vehicle message having location information to which the associated virtual phase selector has subscribed. If a timer has expired, at block 172 the scheduler stops the virtual phase selector associated with that timer. Processing of another vehicle message then continues at block 158.

Figure 4:
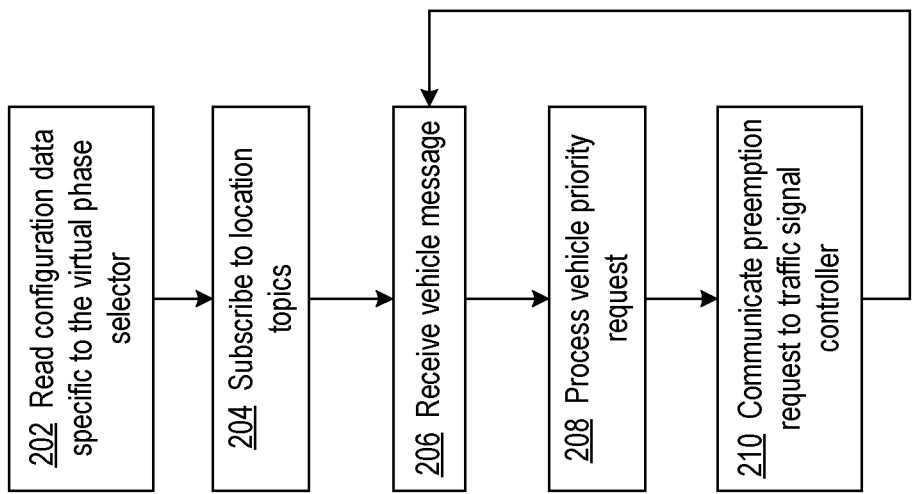
FIG. 4 shows a flowchart of a process performed by a virtual phase selector.

FIG. 4 shows a flowchart of a process performed by a virtual phase selector. At block 202, the virtual phase selector reads the configuration data that is specific to that virtual phase selector. The specific configuration data can identify a traffic signal controller to which preemption requests are to be communicated and location information that describe location topics to which the virtual phase selector is to subscribe. At block 204, the virtual phase selector subscribes to the location topics with the message broker (FIG. 2, #104). Each subscription request specifies a location, such as a latitude coordinate and a longitude coordinate, and an associated subscriber identifier. The subscriber identifier can identify and address the virtual phase selector to which a published message is to be sent if the location topic in a published message matches location specified by the subscription. After subscribing to the location topics, the virtual phase selector can place itself, or be placed by the scheduler, into an idle state and wait to be restarted to process a vehicle message.

The virtual phase selector receives a vehicle message at block 206. The vehicle message can be communicated from the message broker while the virtual phase selector is active/executing, or received from the scheduler when the scheduler has been restarted by the scheduler. When the virtual phase selector is restarted by the scheduler, the processing commences at block 206; the processing of blocks 202 and 204 is not repeated when the virtual phase selector is restarted.

At block 208, the virtual phase selector processes the traffic signal priority request specified in the vehicle message. The algorithm performed by the virtual phase selector in processing the priority request determines whether and when a preemption request can be communicated to the assigned traffic signal controller. The algorithm implemented by the virtual phase selector can be the same as the algorithm implemented in physical phase selectors that have been employed in prior systems.

When and if the virtual phase selector determines that the vehicle that issued the vehicle message merits alteration of the phase of the traffic signals at the associated intersection, the virtual phase selector at block 210 generates and communicates a preemption request to the associated traffic signal controller. In generating the preemption request, the virtual phase selector generates control data that indicates a request to modify the phase of traffic lights at the associated intersection. The virtual phase selector can communicate preemption requests to the traffic signal controller with or without involvement of an intervening or overarching traffic management system such as an Advanced Traffic Management System (ATMS). After communicating the preemption request, the virtual phase selector returns to block 206 to wait to receive another vehicle message.

The disclosed methods and systems employ location subscriptions to distribute vehicle messages having traffic signal priority requests. Use of location subscriptions in combination with virtual phase selectors reduces the requirements for communication resource requirements and computational resources.

Some traffic signal preemption systems, such as GPS-based systems, use approach maps in determining when to preempt a traffic signal. Generally, an approach map defines the boundaries of an area relative to an intersection. If an authorized vehicle is within the defined boundaries and communicates a preemption request to the phase selector at the intersection, preemption or priority can be granted if there is no competing, higher-priority request.

Determining whether or not a vehicle is within an area defined by an approach map can consume considerable processor resources. In addition, distributing messages having preemption requests over a network to intersection controllers can incur large data communication expenses. Emergency, fleet, and transit vehicles can receive preemption or priority from a phase selector in order to remove or reduce the number of red lights encountered at intersections. If the vehicle always traverses a pre-defined route the relevant information as to when to request the service can reside on a vehicle control unit. However, if the vehicle drives a random route the vehicle control unit does not have the processing or storage power available to make requests as it would need to take into account all available possibilities.

The disclosed methods and systems can reduce processing and communication requirements associated with the processing of traffic signal preemption requests. In addition, the disclosed approaches can be employed in numerous other applications involving moving vehicles broadcasting their locations and one or more processing units interested in being alerted to the presence of the vehicles only when the vehicles are located in specific areas or spaces. For example, the disclosed approaches can be used in an application to warn pedestrians of approaching emergency vehicles, such as through equipment installed near roads or through portable communication devices (e.g., smartphones, tablets etc.). The disclosed approaches could also be used in an application to alert civilian vehicles of nearby emergency vehicles. In another application, a drone having no radar equipment could be alerted to nearby drones. In such alternative applications, the disclosed virtual phase selectors could be replaced by alert processes that are activated when messages having subscribed-to locations are received.

The disclosed methods and systems efficiently handle vehicle message processing through a message transport involving subscription, publication, and brokerage based on subscriptions to location topics. Truncation of coordinates that specify a base location and a location of a vehicle are employed to determine whether or not the vehicle is within a geographic area implied by the base location. Subscriber processors, such as a scheduler and virtual phase selectors can subscribe to receive published messages having location topics ("published locations") that match location topics specified in subscriptions ("subscribed-to locations"). Each of the locations can be specified as a pair of geographical coordinates, and both the truncated vehicle coordinates in published locations and the truncated base location coordinates in subscribed-to locations can be specified as character strings. Thus, determining whether or not a vehicle is within a particular geographic area can be accomplished by comparison of character strings.

Figure 5:
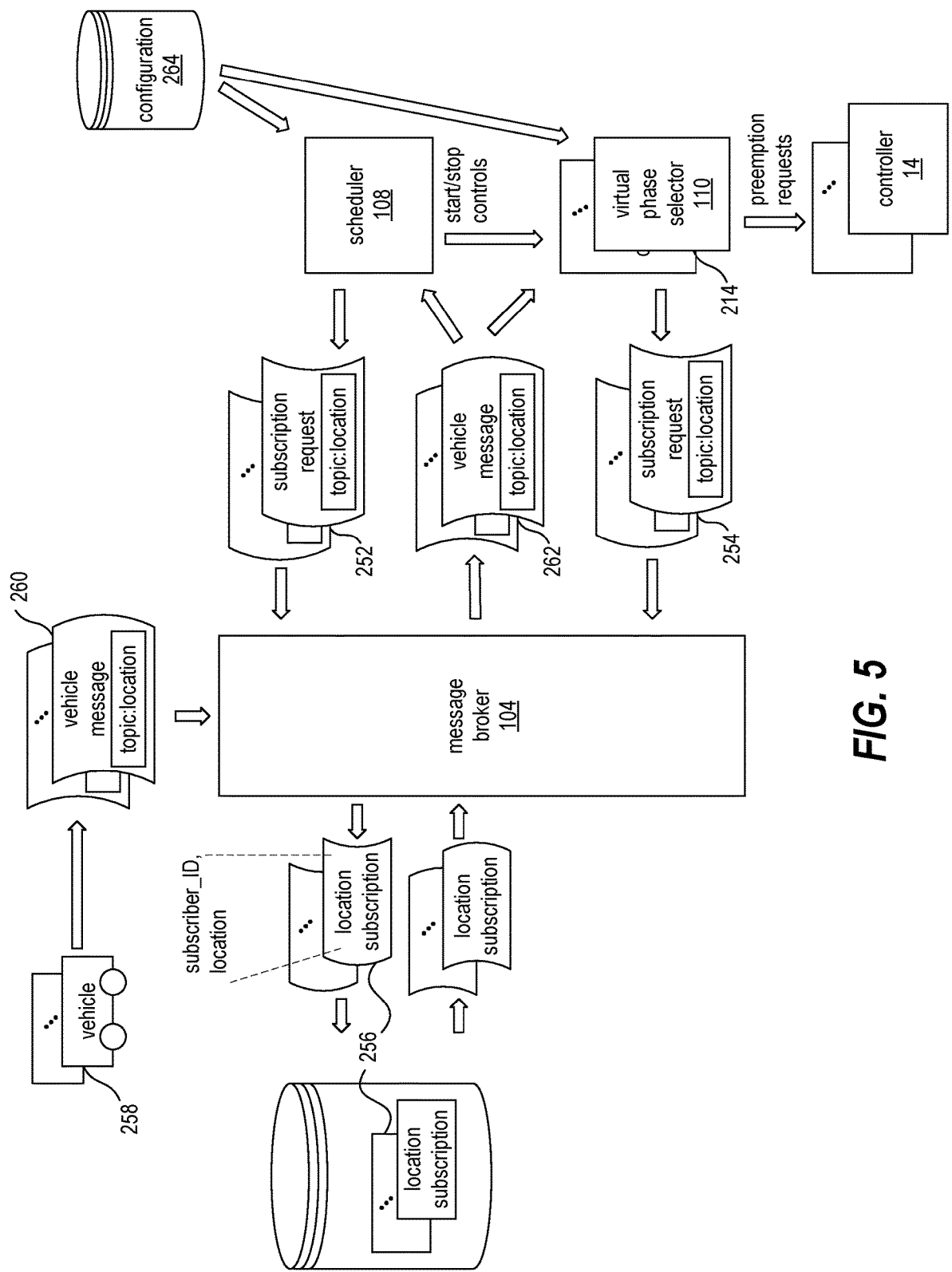
FIG. 5 shows a dataflow diagram associated with the processing of vehicle messages according to subscriptions to locations by the scheduler and virtual phase selectors.

FIG. 5 shows a dataflow diagram associated with the processing of vehicle messages according to subscriptions to locations by the scheduler and virtual phase selectors. The scheduler 108 and the virtual phase selectors 110 issue subscription requests 252 and 254 to the message broker 104. Each subscription request specifies a geographical location as a message topic to which the subscriber seeks to subscribe. Each subscription request can additionally include a subscriber identifier, which the message broker can subsequently use to direct published vehicle messages. According to one application, each subscriber can be configured to generate multiple subscription requests, with each subscription request indicating a different location.

The set of locations subscribed to by a subscriber, such as a virtual phase selector, can be interpreted to encompass the approaches to an intersection having traffic signals controlled by a traffic signal controller associated with the virtual phase selector. Each approach covers an area of road leading to the intersection and defines an area in which vehicle messages issued from the area are not ignored but are evaluated for possibly granting preemption. The subscription requests 252 from the scheduler can specify the locations of all the subscription requests 254 made by all the virtual phase selectors 110 (as well as the inactive virtual phase selectors 112 (FIG. 2). The scheduler and virtual phase selectors can obtain the location information needed for subscribing to locations from a storage circuit having configuration data 264.

The message broker 104 can execute on a server that receives the subscription requests 252 and 254 and stores location subscriptions 256 for subsequent retrieval when needed to evaluate a published vehicle message. The message broker can store the subscriptions to location topics in a database and access the subscriptions in the database for comparison to published messages. Each subscription specifies a location topic and a subscriber identifier. If multiple subscribers make subscriptions requests to the same location, the message broker will associate the subscriber identifiers of the subscribers with the same location. In one implementation, for example, a message transport such as the MQTT message transport protocol can be used to manage the subscriptions and brokering of messages.

In exemplary applications, the publishers of messages can be processors that are aboard moving vehicles 258. The processors transmit messages that specify current locations of the vehicles. The published messages 260 can include additional information depending on the application. For example, for traffic signal preemption applications, each published message can specify a vehicle class and/or a vehicle identifier, along with a priority request for seeking preemption of a traffic signal. As a vehicle is in motion, the onboard processor can send multiple published messages, each indicating a different location. In other applications, the vehicles can be other than those requesting traffic signal preemption. For example, the vehicles can be manned or unmanned aircraft, unmanned terrestrial vehicles, or self-driving terrestrial vehicles. The message publishers 258 transmit messages wirelessly to the message broker 104. The wireless transmission can be through a metropolitan WiFi network or a cellular telephone network communicatively coupled to the message broker, for example.

Each vehicle has onboard equipment configured to determine the current location of the vehicle and transmit the location to the message broker. The onboard equipment can include a micro-processor programmed to coordinate the collection of location data and initiate the transmission of published messages. An onboard GPS module can repeatedly obtain GPS coordinates and provide the current coordinates to the micro-processor as the vehicle is moving. In some applications, the onboard equipment can include an altimeter that obtains and provides current, measured altitudes to the processor. The micro-processor can be coupled to an onboard radio transmitter for transmitting the published messages.

Each published message 260, which can be referred to as a vehicle message, specifies a location, which is the published topic. The location can indicate a (then-current) geographical position of the vehicle. The geographical location can be specified as coordinates of latitude and longitude, either in decimal degrees or as degrees-minutes-seconds (DMS). In some applications, the location can include a value indicating the altitude, in combination with the geographical location.

The message broker 104 receives the published location messages and filters the messages according to the locations specified in the messages and subscriptions 256 to locations. The filtering of the messages involves the message broker determining for each received vehicle message, whether or not the published geographical location specified in the message is the same as any of the subscribed-to locations 256.

For each published message that the message broker 104 determines has a location topic that matches a subscribed-to location topic, the message broker communicates the published vehicle message 262 to each subscriber to that location. Multiple subscribers can subscribe to the same location topic, and the message broker can communicate the published message to each of the subscribers. In an exemplary application, the virtual phase selectors, which are responsible for different intersections, can subscribe to the same location, and the message broker would send a matching message to each of the virtual phase selectors. In response to determining that the location in a published message is outside all of the geographical areas derived from the location subscriptions 256, the message broker discards the message.

Figure 6:
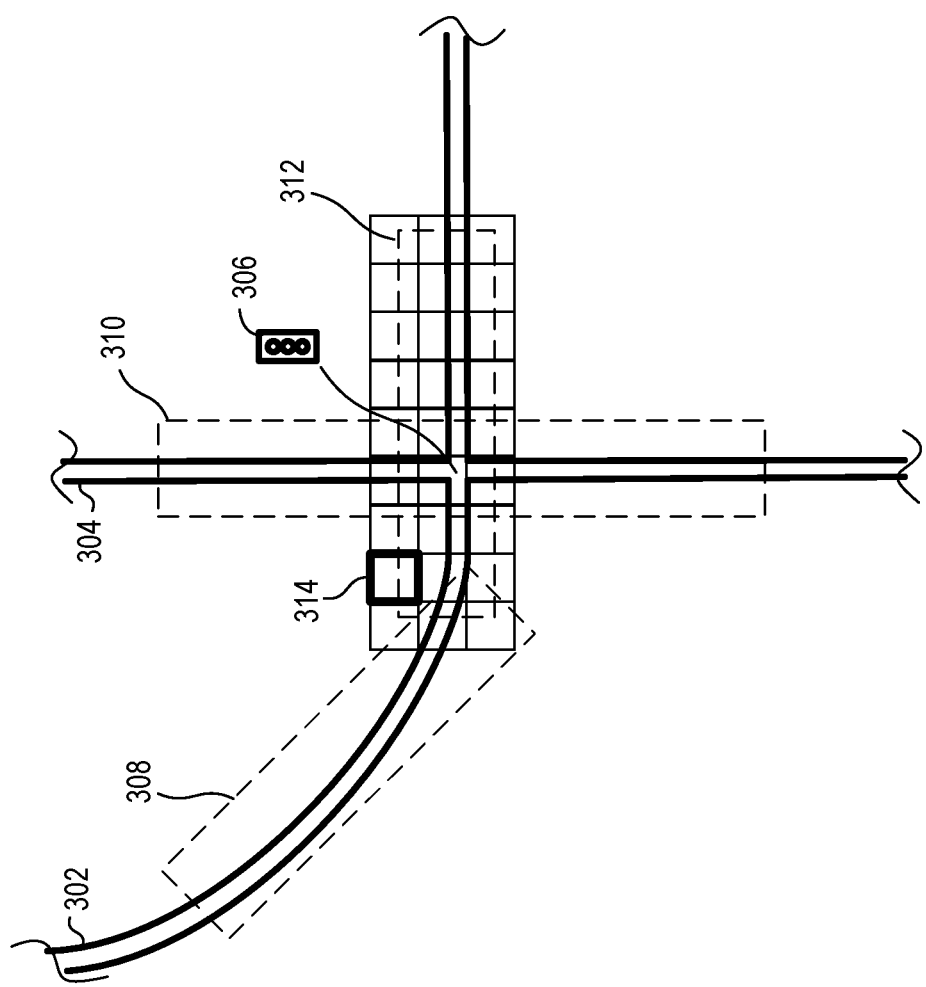
FIG. 6 shows an example of an intersection of two roads at which a traffic signal arrangement controls traffic.

FIG. 6 shows an example of an intersection of roads 302 and 304 at which a traffic signal arrangement 306 controls traffic. The example shows multiple approaches 308, 310, and 312, each of which is defined by a dashed-line rectangle. Each approach is an area in which if an authorized vehicle is within the defined boundaries and communicates a preemption request to the phase selector, the preemption can be granted if there is no competing, higher-priority request.

Each approach can be implemented as multiple location subscriptions that implicitly cover the area of the approach. Each location subscription implies a geographic area, and the example illustrates for approach 312 the implied geographic areas as solid-line rectangles, of which the bold line rectangle 314 is an example. Though not shown, the approaches 308 and 310 can also be implemented by sets of multiple location subscriptions that imply multiple geographic areas that cover the areas of the approaches. Polygons other than rectangles could be used in other applications. For efficient computation in determining matches between published locations and subscribed-to locations, the rectangles implied by the subscribed-to locations have two parallel to geographic lines of latitude and two sides parallel to geographic lines of longitude.

Figure 7:
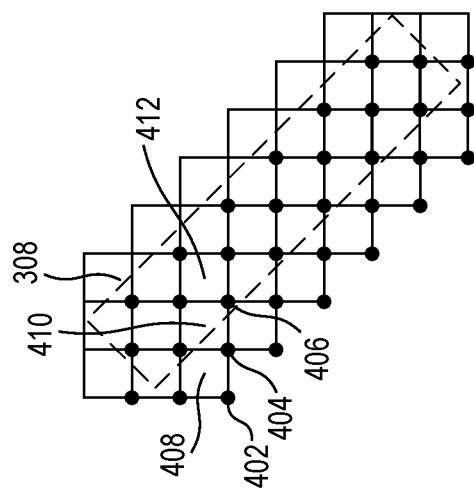
FIG. 7 shows one of the approaches shown in FIG. 6 and the location subscriptions that implement the approach by way of geographical coordinates that imply rectangular areas that cover the approach.

FIG. 7 shows the approach 308 from FIG. 6 and the location subscriptions that implement the approach by way of geographical coordinates that imply rectangular areas that cover the approach. The location subscriptions that define an approach can be automatically generated either by a phase selector or by a configuration tool. An input specification of an approach defines the geographic area to be covered by the location subscriptions. The specification of the approach can be generated by a person interacting with a graphical user interface-based tool that allows drawing of a rectangle or some other object over a road leading to an intersection. The tool can execute on a central server or at a phase selector. Geographic information describing the roads and specified approaches can be determined from a geographic information system. The geographic specification of the approach can be stored in association with the identifier for a particular phase controller.

Once an approach has been specified, the location subscriptions can be determined and generated by tiling rectangles in an arrangement that covers the area bounded by the approach. The tiling can commence at an extreme point (latitudinally or longitudinally) on the boundary of the approach and proceed latitudinally and longitudinally until the area of the approach is covered. The process can be repeated for additional approaches to the intersection.

In an exemplary approach, the location of each location subscription can represent the corner of a fixed-size rectangular geographical area. For example, the black dots 402, 404, and 406 are the corners of rectangles 408, 410, and 412, respectively. A geographical area of a rectangle is implied by a subscribed-to location, because the level of precision of the raw coordinates determined onboard a vehicle are reduced by truncation to produce published coordinates that have the same level of precision as the subscribed-to coordinates. For example, the subscribed-to coordinates of a subscription can be 12.345 degrees latitude and 87.654 degrees longitude. The raw GPS coordinates could be 12.345678 and 87.654321 degrees longitude.

Truncating the raw GPS coordinates to 5 levels of precision can produce published coordinates of 12.345 degrees latitude and 87.654 degrees longitude, which are the same as the subscribed-to coordinates. The subscribed-to coordinates imply a rectangular geographic area ranging from 12.345000 to 12.345000 degrees latitude and from 87.654000 to 87.654999 degrees longitude, because truncation of the raw GPS coordinates reduces the number of levels of precision from 8 to 5.

FIG. 8A shows a flowchart of a process by which subscriptions to location topics are used to manage the distribution of published vehicle messages from vehicles. FIGS. 8B-8E show an example in which the process of FIG. 8A is applied to a location subscription and a published vehicle message.

At block 502, the message broker receives location subscription requests from the scheduler and from the virtual phase selectors. Each location subscription request includes a location topic and a subscriber identifier. At block 504, the message broker can establish location subscriptions in response to the subscription requests. The message broker can store the location subscriptions in a storage arrangement including hard disk drives, solid state disks, and/or RAM. In some applications, the subscriptions may be transitory as the message subscriber may also be moving, and the locations of interest to the subscriber may change as the subscriber moves or changes location.

FIG. 8B shows an example of information stored as a location subscription 552. The example specifies a topic location of 12.345 degrees latitude, 87.654 degrees longitude, and a subscriber identifier of ID1. The subscriber information can also or alternatively include an address (not shown) for communication. In other applications, the topic can include an altitude (not shown). Notably, the topic location can be specified as the character string "12.345; 87.654" that represents the latitude and longitude coordinates.

FIG. 8C shows an example of the geographical area 572 implied by truncation of published geographic coordinates and subscribed-to coordinates. Notably, the coordinates that define the location in the subscription 552 are specified with a lesser degree of precision than are the coordinates of the implied geographical area 572. In the example, the subscribed-to location is 12.345 degrees latitude and 87.654 degrees longitude. The implied geographical area is the polygon having corners at (12.345000, 87.654000), (12.345000, 87.654999), (12.345999, 87.654999), and (12.345999, 87.654000). The geographical area is implied by additional levels of precision truncated from the raw latitude and longitude coordinates.

FIG. 8D shows an example of raw geographical data 574 prior to truncation for a published location message. The example shows 12.345678 degrees latitude and 87.654321 degrees longitude. The raw geographical coordinates can be truncated, either by a processor onboard a vehicle or by a message server.

FIG. 8E shows an example of a published location message 562 having truncated coordinates. The published messages communicates a location of 12.345 degrees latitude and 87.654 degrees longitude, which can be specified as the character string, "12.345;87.654." The published message can also include additional information, such as signal controls 564 that can be evaluated by a phase controller for determining whether to modify a phase of the traffic signal.

At block 506, the message broker receives published vehicle messages. Each vehicle message has location information that indicates a geographical location of the vehicle. For some applications, the location message can also specify an altitude. The precision of the altitude in the published message can be truncated to have fewer levels of precision than the altitude measured by equipment onboard the vehicle.

At block 508, the message broker determines for each received vehicle message, whether or not the location topic in the message matches any of the subscribed-to locations. Matches can be determined by the message broker by comparing the character strings of the published locations to character strings that specify the subscribed-to locations.

At block 510, the message broker discards each received published message having a location topic determined to indicate a geographical location that does not match any of the subscribed-to locations. At block 512, the message broker transmits to one or more message subscribers (scheduler and virtual phase selector(s)), each location message determined to indicate a geographical location that matches the location topic of a location subscription. The message subscribers to which the published messages are sent are identified by the subscriber identifier in the matching subscription.

Figure 9:
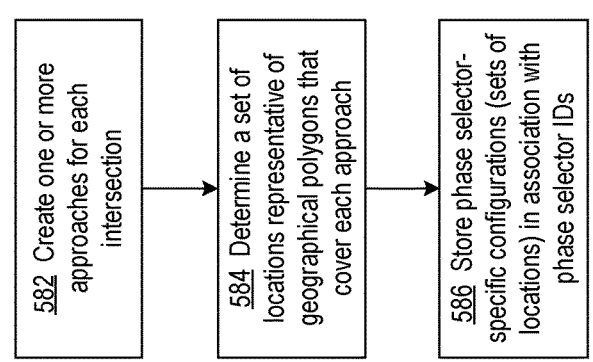
FIG. 9 is a flowchart of a process for preparing configuration data for the virtual phase selectors.

FIG. 9 is a flowchart of a process for preparing configuration data for the virtual phase selectors. At block 582, according to one application, a GUI-based tool can be operated to create one or more approaches for each intersection. The specifications of the approaches can be input to a processor programmed that at block 584 determines for each approach, a set of locations that implement the approach based on polygons implied by the locations and covering the geographical area of the approach. At block 586, the tool can store in retentive a storage device, sets of locations in association with identifiers of the virtual phase selectors. The scheduler and virtual phase selectors can read the configuration data and generate the necessary subscription requests described above.

Figure 10:
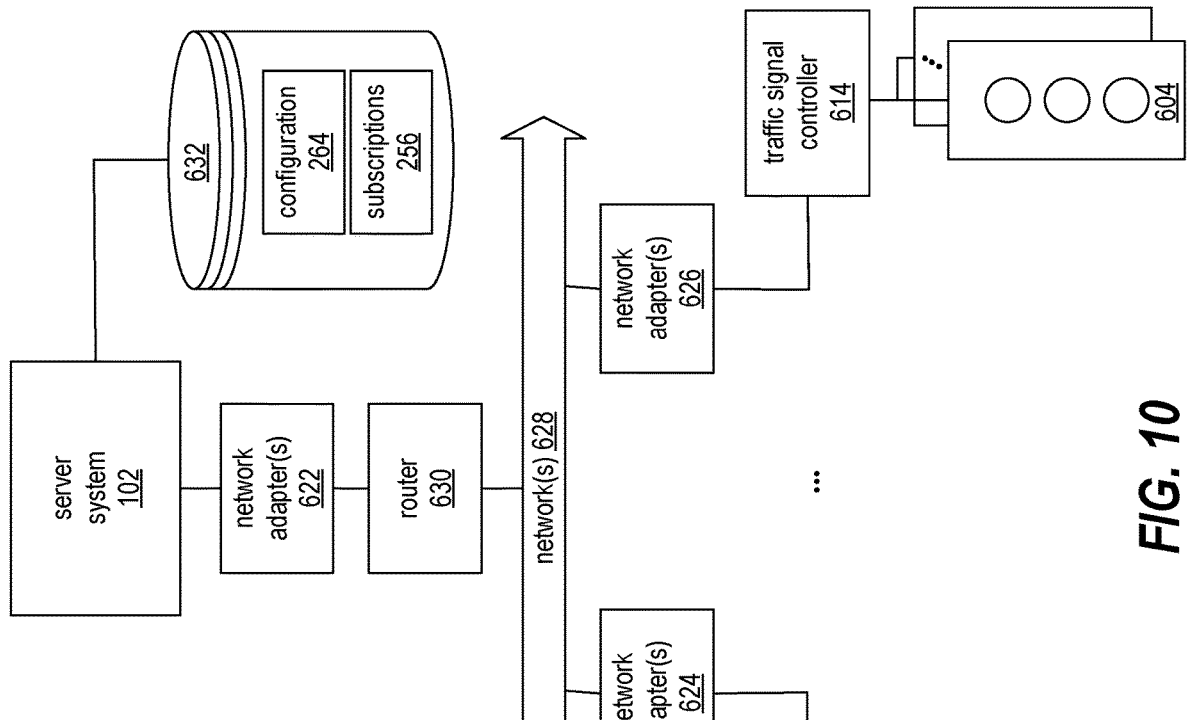
FIG. 10 is a block diagram of an exemplary system for altering phases of traffic signals by virtual phase selectors.

FIG. 10 is a block diagram of an exemplary system for altering phases of traffic signals by virtual phase selectors. Traffic lights 602 and 604 at intersections are coupled to traffic signal controllers 610 and 614, respectively. Traffic signal controllers 610 and 614 are communicatively coupled to virtual phase selectors (not shown) executing on server system 102. The server system can also execute a message broker (not shown).

The server system 102 is coupled to the traffic signal controllers 610 and 614 through network adapters 622, 624, and 626 and network 628. In various embodiments, a router or a network switch, as shown by router 630, may be coupled between the network adapter and the network. It is understood the server system 102 and the traffic signal controllers 610 and 614 can be connected through more than one network, coupled by additional switches and routing resources, including a connection over the Internet.

The server 102 is additionally coupled to a storage arrangement 632, which stores configuration data 264 and location subscriptions 256. It will be recognized that storage arrangement 632 can comprise several local and/or remote servers and one or more databases.

It is understood that numerous network transfer protocols may be used to establish, maintain, and route connections including: TCP/IP, UDP, NFS, ESP, SPX, etc. It is also understood that network transfer protocols may utilize one or more lower layers of protocol communication such as ATM, X.25, or MTP, and on various physical and wireless networks such as, Ethernet, ISDN, ADSL, SONET, IEEE 802.11, V.90/v92 analog transmission, etc.

The processes of the message publishers, message broker, scheduler, and virtual phase selectors can be implemented as arrangements of micro-processors and computer processors programmed to perform the operations described herein. Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of the present invention encoded in a processor executable format, may be stored and provided via a variety of computer-readable storage media or delivery channels such as magnetic or optical disks or tapes, electronic storage devices, or as application services over a network.

Various logic may be implemented as circuitry to carry out one or more of the operations and activities described herein and/or shown in the figures. In these contexts, a circuit or circuitry may be referred to as a "processor," "logic," "module," "engine," block," or "unit." It should be understood that processors logic, modules, engines, blocks and units are all circuits that carry out one or more of the operations/activities. In certain implementations, a programmable circuit is one or more computer circuits programmed to execute a set (or sets) of instructions stored in a ROM or RAM and/or operate according to configuration data stored in a configuration memory.

The present invention is thought to be applicable to a variety of systems for a phase selector. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:
1. A method, comprising:
receiving by a server system, vehicle messages having information transmitted from a plurality of vehicle processors, wherein each vehicle message specifies published geographical coordinates that indicate a geographical location of a vehicle of a plurality of vehicles, and the server system is configured with program code that is executable to implement a plurality of virtual phase selectors;
for each vehicle message:
determining by the server system, one or more of the plurality of virtual phase selectors that are associated with the published geographical coordinates,
determining by the server system for each of the one or more virtual phase selectors, whether or not program code that implements the virtual phase selector is executing,
starting execution on the server system of the program code that implements each of the one or more virtual phase selectors determined to be not executing,
communicating the vehicle message to the one or more virtual phase selectors,
determining traffic signal control data by each of the one or more virtual phase selectors based on the vehicle message, and
transmitting the traffic signal control data to one or more traffic signal controllers associated with the one or more virtual phase selectors at one or more intersections; and
stopping execution of an executing virtual phase selector in response to absence of a vehicle message having published geographical coordinates associated with the executing virtual phase selector for a period that is greater than a threshold period.

2. The method of claim 1, wherein the determining traffic signal control data includes:
determining whether or not to modify phases of traffic lights at each of the one or more intersections based on vehicle identification information in the vehicle message; and
generating the traffic signal control data to modify the phase of traffic lights at an intersection in response to the vehicle identification information in the vehicle message qualifying to modify phases of the traffic lights at the one or more intersections.

3. The method of claim 1, further comprising:
wherein the determining one or more virtual phase selectors includes:
accessing a plurality of subscriptions to location topics in a storage arrangement by a message broker in response to receiving the vehicle message, wherein each location topic specifies subscribed-to geographical coordinates of a location, and
determining by the message broker, whether or not the published geographical coordinates in the vehicle message match any of the subscribed-to geographical coordinates;
discarding by the message broker, each vehicle message having published geographical coordinates that do not match any of the subscribed-to geographical coordinates; and
wherein communicating the vehicle message to the one or more virtual phase selectors is in response to the vehicle message having published geographical coordinates that match the subscribed-to geographical coordinates of one or more of the plurality of subscriptions and identification of the one or more virtual phase selectors by the one or more of the subscriptions.

4. The method of claim 1, further comprising:
wherein the published geographical coordinates are a version of actual geographical coordinates truncated from a first level of precision to a second level of precision;
wherein the determining one or more virtual phase selectors includes:
accessing a plurality of subscriptions to location topics in a storage arrangement by a message broker in response to receiving the vehicle message, wherein each location topic specifies in the second level of precision, subscribed-to geographical coordinates of a location, and
determining by the message broker, whether or not the published geographical coordinates in the vehicle message match any of the subscribed-to geographical coordinates;
discarding by the message broker, each vehicle message having published geographical coordinates that do not match any of the subscribed-to geographical coordinates; and
wherein communicating the vehicle message to the one or more virtual phase selectors is in response to the vehicle message having published geographical coordinates that match the subscribed-to geographical coordinates of one or more of the plurality of subscriptions and identification of the one or more virtual phase selectors by the one or more of the subscriptions.

5. The method of claim 4, wherein:
for each intersection of the one or more intersections:
a subset of the plurality of subscriptions that includes multiple ones of the plurality of subscriptions defines an approach to the intersection; and
each subscription of the subset identifies a virtual phase selector of the plurality of virtual phase selectors; and
the determining includes determining whether or not the published geographical coordinates match the subscribed-to geographical coordinates of the multiple ones of the subscriptions.

6. The method of claim 4, wherein the subscribed-to geographical coordinates of each location topic include one latitude coordinate and one longitude coordinate, and the one latitude coordinate and one longitude coordinate are representative of a geographical area.

7. The method of claim 6, wherein the geographical area is a rectangle.

8. The method of claim 7, wherein the rectangle has first sides oriented parallel to geographic lines of latitude and second sides oriented parallel to geographic lines of longitude.

9. The method of claim 4, wherein:
the receiving vehicle messages includes receiving the published geographical coordinates specified as a character string;
the accessing subscriptions includes accessing the subscribed-to geographical coordinates specified as a character string; and
the determining includes comparing the character string that specifies the published geographical coordinates to the character string that specifies the subscribed-to geographical coordinates.

10. A system comprising:
a server system having an arrangement of one or more computer processors; and
a memory arrangement coupled to the one or more computer processors and configured with program code that is executable to implement a plurality of virtual phase selectors, the memory arrangement further configured with instructions that when executed by the one or more computer processors cause the one or more computer processors to perform operations including:

receiving vehicle messages having information transmitted from a plurality of vehicle processors, wherein each vehicle message specifies published geographical coordinates that indicate a geographical location of a vehicle of a plurality of vehicles;

for each vehicle message:

determining one or more virtual phase selectors associated with the published geographical coordinates, determining for each of the one or more virtual phase selectors, whether or not program code that implements the virtual phase selector is executing, starting execution on the arrangement of one or more computer processors of the program code that implements each of the one or more virtual phase selectors determined to be not executing, communicating the vehicle message to the one or more virtual phase selectors, determining traffic signal control data by each of the one or more virtual phase selectors based on the vehicle message, and transmitting the traffic signal control data to one or more traffic signal controllers associated with the one or more virtual phase selectors at one or more intersections; and stopping execution of an executing virtual phase selector in response to absence of a vehicle message having published geographical coordinates associated with the executing virtual phase selector for a period that is greater than a threshold period.

11. The system of claim 10, wherein the instructions for determining traffic signal control data include instructions for:

determining whether or not to modify phases of traffic lights at each of the one or more intersections based on vehicle identification information in the vehicle message; and generating the traffic signal control data to modify the phase of traffic lights at an intersection in response to the vehicle identification information in the vehicle message qualifying to modify phases of the traffic lights at the one or more intersections.

12. The system of claim 10, wherein:

the instructions for determining one or more virtual phase selectors include instructions for:

accessing a plurality of subscriptions to location topics in a storage arrangement by a message broker in response to receiving the vehicle message, wherein each location topic specifies subscribed-to geographical coordinates of a location, and determining by the message broker, whether or not the published geographical coordinates in the vehicle message match any of the subscribed-to geographical coordinates;

the memory arrangement is configured with instructions that when executed by the one or more computer processors cause the one or more computer processors to perform operations including discarding by the message broker, each vehicle message having published geographical coordinates that do not match any of the subscribed-to geographical coordinates; and the processor in executing the instructions for communicating the vehicle message to the one or more virtual phase selectors is responsive to the vehicle message having published geographical coordinates that match the subscribed-to geographical coordinates of one or more of the plurality of subscriptions and identification of the one or more virtual phase selectors by the one or more of the subscriptions.

13. The system of claim 10, wherein:

the published geographical coordinates are a version of actual geographical coordinates truncated from a first level of precision to a second level of precision;

the instructions for determining one or more virtual phase selectors include instructions for:

accessing a plurality of subscriptions to location topics in a storage arrangement by a message broker in response to receiving the vehicle message, wherein each location topic specifies in the second level of precision, subscribed-to geographical coordinates of a location, and determining by the message broker, whether or not the published geographical coordinates in the vehicle message match any of the subscribed-to geographical coordinates;

the memory arrangement is configured with instructions that when executed by the one or more computer processors cause the one or more first computer processors to perform operations including discarding by the message broker, each vehicle message having published geographical coordinates that do not match any of the subscribed-to geographical coordinates; and the processor in executing the instructions for communicating the vehicle message to the one or more virtual phase selectors is in responsive to the vehicle message having published geographical coordinates that match the subscribed-to geographical coordinates of one or more of the plurality of subscriptions and identification of the one or more virtual phase selectors by the one or more of the subscriptions.

14. The system of claim 13, wherein:

for each intersection of the one or more intersections:

a subset of the plurality of subscriptions that includes multiple ones of the plurality of subscriptions defines an approach to the intersection; and each subscription of the subset identifies a virtual phase selector of the plurality of virtual phase selectors; and the instructions for determining include instructions for determining whether or not the published geographical coordinates match the subscribed-to geographical coordinates of the multiple ones of the subscriptions.

15. The system of claim 13, wherein the subscribed-to geographical coordinates of each location topic include one latitude coordinate and one longitude coordinate, and the one latitude coordinate and one longitude coordinate are representative of a geographical area.

16. The system of claim 15, wherein the geographical area is a rectangle.

17. The system of claim 16, wherein the rectangle has first sides oriented parallel to geographic lines of latitude and second sides oriented parallel to geographic lines of longitude.

18. The system of claim 13, wherein:

the instructions for receiving vehicle messages include instructions for receiving the published geographical coordinates specified as a character string;

the instructions for accessing subscriptions include instructions for accessing the subscribed-to geographical coordinates specified as a character string; and the instructions for determining include instructions for comparing the character string that specifies the published geographical coordinates to the character string that specifies the subscribed-to geographical coordinates.

* * * * *

UNITED STATES PATENT AND TRADEMARK OFFICE
CERTIFICATE OF CORRECTION

| | | |
|---|---|---|
| PATENT NO. | : 11,200,802 B1 | Page 1 of 1 |
| APPLICATION NO. | : 16/902454 | |
| DATED | : December 14, 2021 | |
| INVENTOR(S) | : David John Edwardson | |

It is certified that error appears in the above-identified patent and that said Letters Patent is hereby corrected as shown below:

In the Claims

In Column 15, Line 1 and Column 16, Line 62, insert --a-- before "program code".
In Column 15, Line 9 and Column 17, Line 11, insert --the-- before "program code".
Insert --of the plurality of-- before "virtual phase selectors" in the following:
Column 15, Lines 9, 13, 16, 18, 22, 41, 57 and 61; Column 16, Lines 1, 18 and 22;
Column 17, Lines 7, 10, 15, 18, 20, 24, 44 and 63; and Column 18, Lines 2, 8, 28 and 33.
In Column 15, Line 10 and Column 17, Line 12, change "the virtual phase selector" to --the plurality of virtual phase selectors--.
Change "a" to --the-- in the following:
Column 15, Line 25; Column 16, Lines 3 and 52; Column 17, Line 27; and Column 18, Lines 10 and 64.
Insert --the-- before "published geographical coordinates" in the following:
Column 15, Lines 26, 53 and 58; Column 16, Lines 14 and 19; Column 17, Lines 28, 59 and 65; and Column 18, Lines 24 and 30.
In Column 15, Line 36 and Column 17, Line 39, change "phase" to --phases--.
In Column 15, Line 38 and Column 17, Line 41, insert --the-- before "phases".
Insert --the-- before "one or more" in the following:
Column 15, Line 41; Column 16, Line 1; Column 17, Lines 13 and 44; and Column 18, Line 8.
Insert --plurality of-- before "subscriptions" in the following:
Column 15, Line 62; Column 16, Lines 23 and 35; and Column 18, Lines 3, 34 and 46.
In Column 16, Line 7 and Column 18, Line 14, insert --the-- before "subscribed-to geographical coordinates".
In Column 16, Line 39 and Column 18, Line 50, insert --the-- before "longitude".
In Column 16, Line 48 and Column 18, Line 59, insert --the-- before "vehicle messages".
In Column 16, Line 51 and Column 18, Line 62, insert --the plurality of-- before "subscriptions".

Signed and Sealed this
Ninth Day of January, 2024

Katherine Kelly Vidal
*Director of the United States Patent and Trademark Office*